Dec. 11, 1951     F. M. AMBLER     2,578,388
BRAKE SYSTEM FOR VEHICLES

Filed April 8, 1947     2 SHEETS—SHEET 1

INVENTOR.
FRANKLIN MARPLE AMBLER
BY
Campbell, Brumbaugh & Free
HIS ATTORNEYS.

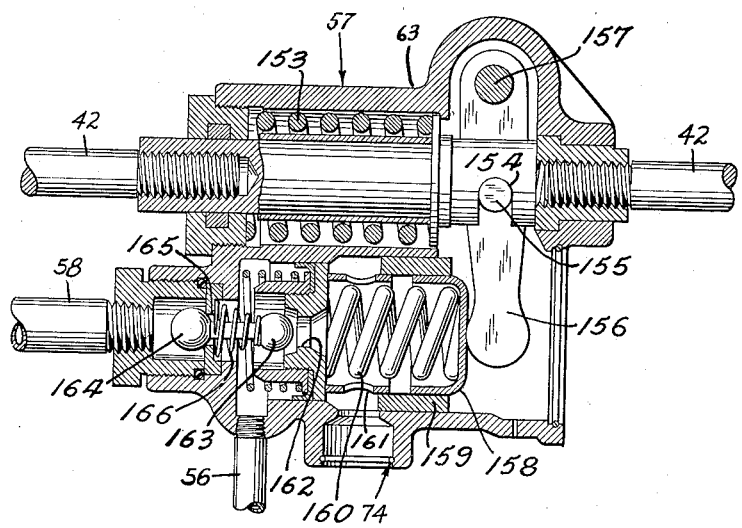

Patented Dec. 11, 1951

2,578,388

UNITED STATES PATENT OFFICE 2,578,388

BRAKE SYSTEM FOR VEHICLES

Franklin Marple Ambler, Allentown, Pa., assignor to Mack Manufacturing Corporation, New York, N. Y., a corporation of Delaware Application April 8, 1947, Serial No. 740,235

2 Claims. (Cl. 188—106)

The present invention relates to power brakes for vehicles, and more particularly to a new and improved power brake system of this character wherein fluid pressure operated means are provided to assist the vehicle operator in applying the hand brake.

The development in recent years of larger vehicles such as motor trucks, for example, has given rise to difficult braking problems. In many trucks currently in use, the masses involved are so large that an operator can barely exert sufficient force to accomplish braking manually, and fluid pressure operated foot brakes are in common use. For reasons of safety, however, hand brakes operated by direct connected levers, rods and the like, requiring manual operation by the operator, are still extensively used. If, for any reason, the fluid pressure operated foot brake system fails, the operator is compelled to rely on manual operation of the mechanical brakes to slow down or stop the vehicle. As noted above, this is quite an arduous operation.

The principal object of the invention, accordingly, is to provide a new and improved braking system for vehicles in which fluid pressure operated means are included for the purpose of assisting the vehicle operator in braking the vehicle by manual operation of the hand brake.

Another object of the invention is to provide a new and improved vehicle braking system of the above character in which braking mechanism is adapted to be operated by a foot actuated fluid pressure system and also by a hand brake actuated fluid pressure system which functions independently of the foot brake fluid pressure system.

A further object of the invention is to provide a new and improved vehicle braking system of the above character in which interlocking means is provided to prevent possible overload of the braking mechanism by the operator applying power to the braking mechanism from the foot actuated and hand brake actuated fluid pressure systems simultaneously.

According to the invention, a braking system is provided in which common braking mechanism is adapted to be operated selectively by a foot actuated fluid pressure system and also by an independent fluid pressure system adapted to be actuated by the usual hand brake lever. The hand brake lever may be mechanically connected to a conventional drive shaft brake or other standard brake. In order to avoid possible overloading of the braking mechanism in the event that the foot actuated fluid pressure system and the hand brake lever actuated fluid pressure system are operated simultaneously, interlocking valve means is provided which renders the hand brake lever actuated fluid pressure system ineffective to operate the braking mechanism after a predetermined fluid pressure has been reached in the foot brake system.

The invention thus provides a highly effective power assisted hand brake for large vehicles. By virtue of the construction described above, the hand brake may be manipulated by the vehicle operator with relative ease. Further, the provision of interlocking valve means to prevent simultaneous full operation of the braking mechanism by both the foot brake and the hand brake eliminates any possibility of damage resulting from overloading the brake mechanism.

Additional objects and advantages of the invention will be apparent from the following detailed description of a typical embodiment, taken in conjunction with the accompanying drawings, in which:

Figure 2 is a view in longitudinal section of hand brake rod valve mechanism employed in the system disclosed in Figure 1;

Figure 3 is a plan view of a form of interlock valve that may be used in the system illustrated in Figure 1; and Figure 4 is a view in vertical section, taken along line 4—4 of Figure 3, looking in the direction of the arrows.

Figure 1:
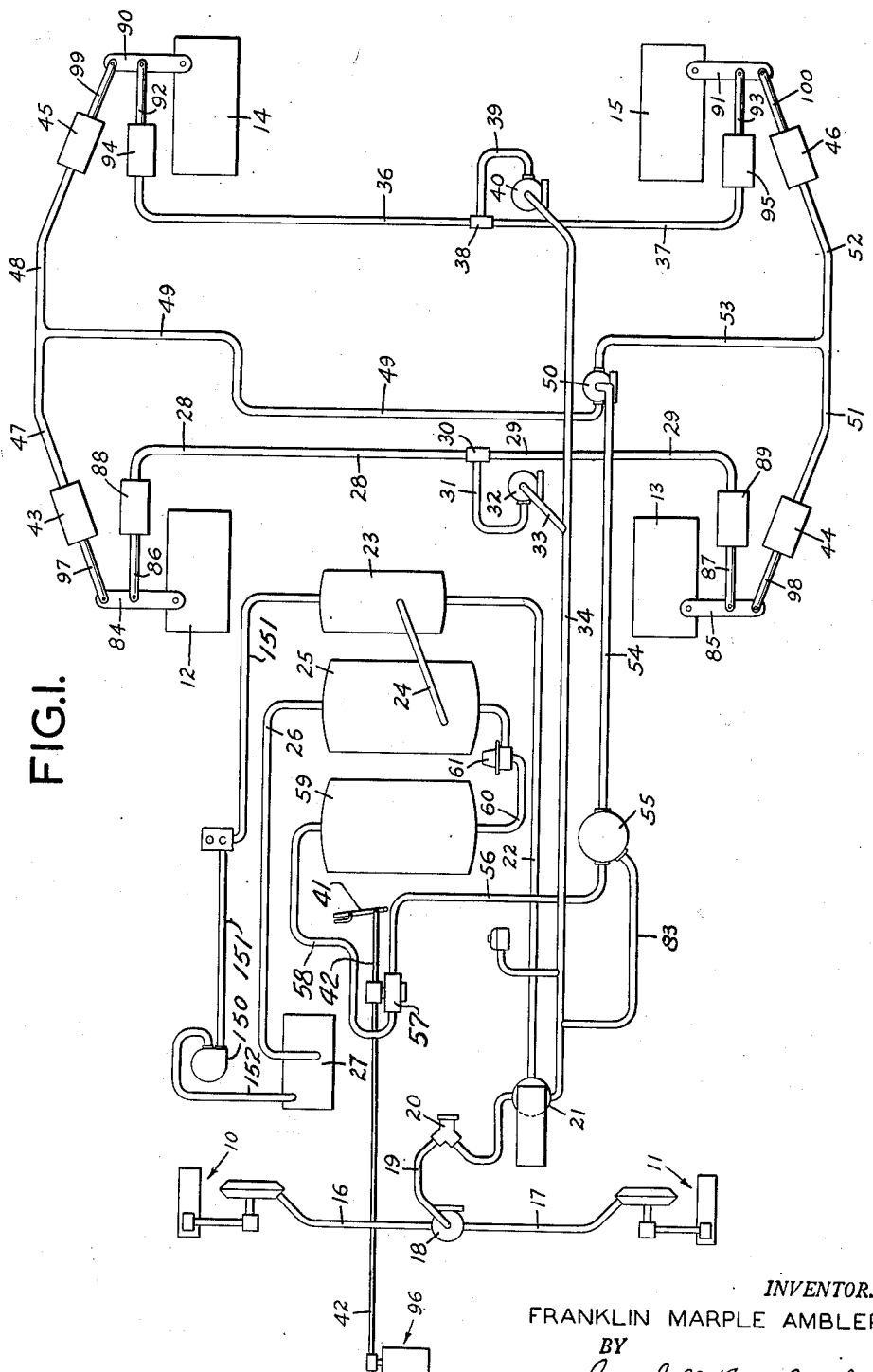
Figure 1 is a schematic diagram of power assisted hand brake mechanism constructed according to the present invention.

By way of example, the invention will be illustrated as applied to the braking system of a six wheel truck, although, obviously, it may effectively be applied to other different types of vehicles. In the embodiment illustrated in Figure 1 of the drawings, the braking system includes a fluid pressure operated foot brake system, an independent hand brake lever actuated fluid pressure system for operating the foot brake, and a conventional mechanical hand brake system. The fluid preessure operated foot brake system includes the front wheel brake mechanisms 10 and 11 and the rear wheel brake mechanisms 12, 13, 14 and 15. Fluid pressure for operation of the front wheel brake mechanisms 10 and 11 is supplied through the conduits 16 and 17, respectively, which are connected to a conventional type quick-release valve 18. The quick-release valve 18 receives a fluid pressure input through a conduit 19 and a limiting valve 20 which is connected to the foot brake valve 21.

The foot brake valve 21 receives a fluid pressure input through the conduit 22 from a pressure tank 23 which receives fluid under pressure through the conduit 24 from a storage tank 25. The storage tank 25 receives fluid under pressure through a conduit 26 from a conventional type compressor 27. The details of the compressor 27 and its associated equipment for maintaining the fluid pressure in the tank 25 within a specified range are conventional and will not be described in detail herein. Suffice it to say that the pressure is maintained in a given range by a governor 150 which responds to the pressure in the tank 23, to which it is connected by a conduit 151. The governor 150 supplies air under pressure through a conduit 152 to control unloader valves (not shown) in the compressor 27 in the usual manner.

The rear wheel foot brake mechanisms 12 and 13 are adapted to be operated by the levers 84 and 85, respectively, which are connected to the piston rods 86 and 87, respectively, of the fluid pressure cylinders 88 and 89, respectively. The cylinders 88 and 89 are adapted to be powered by fluid pressure transmitted thereto through the conduits 28 and 29 which are connected to a junction 30 receiving fluid under pressure through a conduit 31 from another conventional type quick-release valve 32. The fluid pressure input to the quick-release valve 32 is transmitted through a conduit 33 which is connected to a conduit 34 receiving fluid under pressure from the foot brake valve 21.

The rear wheel foot brake mechanisms 14 and 15 are operated by the levers 90 and 91, respectively, which are connected to the piston rods 92 and 93, respectively, of the fluid pressure cylinders 94 and 95, respectively. The pressure cylinders 94 and 95 are adapted to receive fluid under pressure from the conduits 36 and 37 which are connected to a junction 38 which receives fluid under pressure from a conduit 39 connected to a third quick-release valve 40. Fluid under pressure is supplied to the quick-release valve 40 through the conduit 34 which is connected to the foot brake valve 21.

The foot brake system described in the preceding paragraphs is conventional and the front brake mechanisms 10 and 11 and the rear brake mechanisms 12, 13, 14 and 15 are adapted to be operated when pressure is applied to the foot brake valve 21 by the operator of the vehicle in the usual manner.

The quick-release valves 18, 32 and 40 are of conventional type and are so constructed that when the fluid under pressure is supplied thereto by actuation of the foot brake valve 21, the appropriate braking mechanisms are actuated. When the foot brake valve 21 is released and the fluid pressure input to the quick-release valves 18, 32 and 40 is discontinued, the valves act to exhaust fluid under pressure from the braking mechanisms 10 and 11 and the cylinders 88, 89, 94 and 95 to the atmosphere.

The hand brake mechanism in the braking system disclosed in Figure 1 of the drawings includes a conventional type hand brake lever 41 which is connected in the usual manner to a hand brake rod 42 which is adapted to operate a propeller shaft brake or other standard mechanical brake 96.

In accordance with the invention, the braking mechanisms 12, 13, 14 and 15 are adapted to be operated by an independent fluid pressure system which is responsive to actuation of the hand brake lever 41. To this end, a plurality of braking cylinders 43, 44, 45 and 46 are provided, the piston rods 97, 98, 99, and 100, respectively, of which are connected to the levers 84, 85, 90 and 91, respectively, on the braking mechanisms 12, 13, 14 and 15, respectively, for the rear wheels of the vehicle. The brake cylinders 43, 44, 45 and 46 are adapted to be operated by fluid pressure which is supplied thereto when the brake lever 41 is actuated.

Fluid under pressure for operation of the brake cylinders 43 and 45 is supplied through the conduits 47 and 48, respectively. The conduits 47 and 48 are connected to a conduit 49 which receives fluid under pressure from a quick-release valve 50. In similar fashion, the brake cylinders 44 and 46 receive fluid under pressure through the conduits 51 and 52, respectively, which are connected to a conduit 53 receiving an input from the quick-release valve 50.

The quick-release valve 50 receives a fluid pressure input through the conduit 54 and in interlock valve 55 to be described in greater detail hereinafter. The interlock valve 55 is connected by a conduit 56 to a hand brake rod valve 57, to which fluid under pressure is supplied through a conduit 58 from an auxiliary storage tank 59. The auxiliary storage tank 59 receives fluid under pressure through a conduit 60 and a check valve 61 from the main storage tank 25. The check valve 61 is so designed that it blocks passage of fluid from the auxiliary tank 59 to the main tank 25 when the pressure in the main tank 25 drops below a predetermined value. It thus prevents the hand brake lever operated fluid pressure system for the braking mechanisms 12, 13, 14 and 15 from becoming inoperative when the foot brake fluid pressure system fails.

The purpose of the hand brake rod valve 57 is to supply fluid under pressure to the brake cylinders 43, 44, 45 and 46 in proportion to the extent of displacement of the hand brake rod 42. As shown in greater detail in Figure 2, the hand brake rod valve 57 comprises a housing 63 within which the hand brake rod 42 is adapted to be slidably received. It is adapted to receive fluid under pressure from the conduit 58 and to supply it to the conduit 56 such that the pressure in the conduit 56 is proportional to the displacement of the rod 42 when the hand brake 41 is operated. When the hand brake is released, passage of fluid under pressure from the conduit 58 to the conduit 56 ceases and the fluid under pressure in the conduit 56 is exhausted to the atmosphere through the exhaust port 74.

The hand brake rod 42 works against a compression spring 153, and it is provided with a transverse groove 154 therein within which is received a pin 155 on an arm 156 pivoted in the housing 63 at 157. The lower end of the arm 156 engages a cup-shaped member 158 which is slidably mounted within a housing 159 which is also slidable within the housing 63. Seated between one wall of the housing 159 and the cup-shaped member 158 is a compression spring 160. The housing 159 is also provided with exhaust ports 161 and 162. The exhause port 161 communicates with exhaust port 74 and the exhaust port 162 is adapted to be closed by a ball member 163 on which is mounted a second ball member 164 cooperating with a port 165 in a wall of the housing 63. Normally, the ball 164 is maintained in close engagement with the wall of the port 165 by means of a compression spring 166, as shown.

As the hand brake is applied, the rod 42 is moved toward the left and compresses the spring 153. Simultaneously the lever arm 156 is moved towards the left so that the lower end thereof moves the cup 158 and the compression spring 160 together with the housing 159, thereby closing the exhaust port 161 and opening the port 165. This permits air to flow from the conduit 58 to the conduit 56. With the lever arm 156 held in any position between "off" and "on" the air pressure delivered depends upon the compression in the spring 160. When the air pressure in the chamber containing the ball 163 overcomes the pressure of the spring 160, the port 165 closes. The exhaust port 161 is also closed so that the air pressure is held constant.

With the construction shown in Figure 2 and described generally above, the application of the hand brake 41 moves the hand brake rod 42 to the left, thereby supplying fluid under pressure from the conduit 58 to the conduit 56 whence it is fed to the brake cylinders 43, 44, 45 and 46. As explained above, the pressure of the fluid supplied to the brake cylinders 43, 44, 45 and 46 will be essentially proportional to the extent of displacement of the hand brake rod 42. It will be understood, therefore, that when the hand brake lever 41 is actuated, the usual propeller shaft brake 96 will be actuated and, in addition, the braking mechanisms 12, 13, 14 and 15 will be actuated by the brake cylinders 43, 44, 45 and 46, thus facilitating the operation of the hand brake by the operator of the vehicle.

Since the foot brake fluid pressure system and the hand brake fluid pressure system are designed to operate the same braking mechanisms, it will be understood that if, under certain conditions, the operator of the vehicle simultaneously applies the foot brake 21 and the hand brake lever 41, excessively high forces may be applied to the braking mechanisms 12, 13, 14 and 15. In such circumstances, possible damage may result, unless these mechanisms are designed for heavy overloads. In order to prevent any such occurrence, an interlock valve 55 is provided for the purpose of preventing fluid under pressure from being transmitted to the brake cylinders 43, 44, 45 and 46 after the pressure of the fluid supplied by the foot brake valve 21 has reached a predetermined value.

As shown in greater detail in Figures 3 and 4, the interlock valve 55 is adapted to receive an input of fluid under pressure from the conduit 56 and it provides an output of fluid under pressure to the conduit 54. It also is adapted to receive fluid under pressure through a pilot conduit 83 which is connected to the conduit 34 in the main foot brake valve line. When the foot brake valve 21 is actuated, fluid under pressure passes through the pilot conduit 83 to the interlock valve 55 where it passes through a small opening 101 into a chamber 102 in which it acts against a diaphragm 103. The diaphragm 103 is normally urged downwardly by means of a compression spring 104, which may be adjusted for different operating pressures by means of a screw 105.

Secured on the central portion of the diaphragm 103 is a downwardly extending tubular port 170 which is slidably mounted in a suitable packing 171 supported in the valve housing as shown. The tubular port 170 cooperates with a ball member 105a to form a check valve, a compression spring 106 being provided for urging the ball 105a upwardly. Secured to the ball 105a and longitudinally spaced therefrom is a second ball member 172 which is adapted to cooperate with a port 173 in a transverse member 174 to form a second check valve. Normally, when the foot brake system is not in use, the compression spring 104 maintains the tubular port 170 in engagement with the ball 105a and with the ball 172 out of engagement with the port 173. In this position, air from the supply conduit 56 can pass into a chamber 107 which communicates with the conduit 54 and the hand brake system.

When the foot valve system is operated, the pressure of the fluid in the chamber 102 causes the diaphragm 103 to lift against the compression spring 104. This permits the ball valve 105a to be raised by the compression spring 106 thus permitting the ball member 172 to enter the port 173 and preventing fluid under pressure in the conduit 56 from passing into the chamber 107 which communicates with the conduit 54. At the same time, the raising of the diaphragm 103 puts chamber 107 in communication with the atmosphere through the passages 108 and 109, the ball 105a being at this time out of engagement with the tubular port 170.

When the foot brake valve 21 is disengaged, the fluid pressure in the pilot conduit 83 drops, permitting the compression spring 104 to move the diaphragm 103 downwardly. This moves the ball valve 105 downwardly, placing the conduit 56 in communication with the chamber 107, and with the conduit 54. At the same time, communication between the chamber 107 and the passage 108 is broken off so that when the hand brake lever 41 is actuated, fluid under pressure will pass from the conduit 56, through the valve 55 to the conduit 54 to actuate the braking mechanisms 12, 13, 14 and 15. With this construction, the hand brake actuated fluid pressure system is prevented from functioning after the pressure of the fluid supplied by the foot brake valve 21 has reached a predetermined value. This value is so chosen as to prevent damage to the braking mechanisms by simultaneous full operation of the hand brake and foot brake systems.

It will be understood that the braking system described above is not limited to the specific elements shown. As stated, the several types of valves described are conventional and any valves or other devices suitable for the purpose may be employed. Other modifications within the scope of the invention will be readily apparent to persons skilled in the art.

From the foregoing, it will be understood that the invention provides a highly effective braking system for large vehicles, such as trailer type trucks, for example. By providing braking mechanism which is adapted to be operated selectively by a foot brake fluid pressure system or by an independent hand brake actuated fluid pressure system, a vehicle can be effectively braked manually without the application of excessive force by the operator of the vehicle. Further, by interposing an interlock valve between the hand brake rod valve and the brake cylinders that are actuated by the hand brake lever, possible simultaneous full operation of the braking mechanisms by the foot brake fluid pressure system and the hand brake fluid pressure system is effectively prevented.

While a specific embodiment has been described in detail herein, the invention is not intended to be limited thereto but is susceptible of numerous changes in form and detail within the scope of the appended claims.

I claim:

1. In braking systems for vehicles, the combination of braking apparatus for a vehicle, mechanical hand brake mechanism for braking said vehicle, first fluid pressure actuated means responsive to said mechanical hand brake mechanism for operating said braking apparatus, foot actuated, fluid pressure operated means for operating said braking apparatus, a main storage receptacle for fluid under pressure, an auxiliary storage receptacle for fluid under pressure, first conduit means providing communication between said main and auxiliary storage receptacles, second conduit means for supplying fluid under pressure from said auxiliary storage receptacle to said first fluid pressure actuated means, third conduit means for supplying fluid under pressure from said main storage receptacle to said foot actuated fluid pressure operated means, and check valve means in said first conduit means for preventing the flow of fluid from said auxiliary storage receptacle to said main storage receptacle when the fluid pressure in said main storage receptacle falls below a predetermined value.

2. In braking systems for vehicles, the combination of braking apparatus for a vehicle, first fluid pressure actuated means for operating said braking apparatus, main receptacle means for storing fluid under pressure, first conduit means for supplying fluid from said main receptacle means to said first fluid pressure actuated means, foot actuated means in said first conduit means for controlling the supply of fluid to said first fluid pressure actuated means, mechanical hand brake mechanism for braking said vehicle, second fluid pressure actuated means for operating said braking apparatus, auxiliary storage receptacle means for fluid under pressure, second conduit means providing communication for fluid between said main and auxiliary storage receptacle means, check valve means in said second conduit means for preventing fluid flow from said auxiliary storage receptacle means to said main storage receptacle means when the pressure in said main storage receptacle means falls below a predetermined level, third conduit means for supplying fluid under pressure from said auxiliary storage receptacle means to said second fluid pressure actuated means, first valve means in said third conduit means and actuated in response to the operation of said hand brake mechanism for controlling the fluid pressure supplied to said second fluid pressure actuated means in accordance with the extent of operation of said hand brake mechanism, and interlock valve means interposed between said first valve means and said second fluid pressure actuated means and responsive to the fluid pressure supplied to said first fluid pressure means for rendering said second fluid pressure actuated means ineffective to operate the braking apparatus while the first fluid pressure actuated means is effective to operate the braking apparatus.

F. MARPLE AMBLER.

REFERENCES CITED

The following references are of record in the file of this patent:

UNITED STATES PATENTS

| Number | Name | Date |
|---|---|---|
| 1,707,974 | Christensen | Apr. 9, 1929 |
| 1,848,458 | Bragg et al. | Mar. 8, 1932 |
| 1,852,287 | Bragg et al. | Apr. 5, 1932 |
| 1,904,267 | Bragg et al. | Apr. 18, 1933 |
| 2,229,247 | Kamenarovic | Jan. 21, 1941 |
| 2,416,222 | Rodway | Feb. 18, 1947 |

FOREIGN PATENTS

| Number | Country | Date |
|---|---|---|
| 102,866 | Sweden | Oct. 21, 1941 |
| 441,368 | Great Britain | Jan. 17, 1936 |
| 695,944 | Germany | Sept. 6, 1940 |